(12) United States Patent
Lee (10) Patent No.: US 10,027,466 B2
(45) Date of Patent: Jul. 17, 2018

(54) FULL DUPLEX RADIO COMMUNICATION

(71) Applicant: Empire Technology Development LLC, Wilmington, DE (US)

(72) Inventor: Hyoung-Gon Lee, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 18 days.

(21) Appl. No.: 14/888,850

(22) PCT Filed: Apr. 8, 2014

(86) PCT No.: PCT/US2014/033319
§ 371 (c)(1),
(2) Date: Nov. 3, 2015

(87) PCT Pub. No.: WO2015/156776
PCT Pub. Date: Oct. 15, 2015

(65) Prior Publication Data
US 2016/0087779 A1    Mar. 24, 2016

(51) Int. Cl.
| | | |
|---|---|---|
| *H04B 1/56* | (2006.01) |
| *H04L 5/14* | (2006.01) |
| *H04W 76/14* | (2018.01) |
| *H04W 76/02* | (2009.01) |
| *H04L 12/741* | (2013.01) |
| *H04L 12/939* | (2013.01) |
| *H04W 40/24* | (2009.01) |

(Continued)

(52) U.S. Cl.
CPC .............. *H04L 5/14* (2013.01); *H04L 45/74* (2013.01); *H04L 49/555* (2013.01); *H04W 40/24* (2013.01); *H04W 76/023* (2013.01); *H04W 76/14* (2018.02); *H04L 5/0007* (2013.01); *H04W 28/065* (2013.01)

(58) Field of Classification Search
CPC ......... H04L 5/14; H04L 45/74; H04L 49/555; H04L 5/0007; H04W 40/24; H04W 76/023; H04W 28/065
USPC .................. 370/276, 277, 328, 338
See application file for complete search history.

(56) References Cited

U.S. PATENT DOCUMENTS

| | | |
|---|---|---|
| 7,426,249 B2 | 9/2008 | Keaney et al. |
| 8,204,025 B2 | 6/2012 | Cai et al. |
| 8,472,468 B2 | 6/2013 | Takagi et al. |

(Continued)

FOREIGN PATENT DOCUMENTS

WO       02063786 A1     8/2002

OTHER PUBLICATIONS

Bharadia, D., et al., "Full duplex radios," Proceedings of the ACM SIGCOMM 2013 conference on SIGCOMM, pp. 375-386 (Aug. 12-16, 2013).

(Continued)

*Primary Examiner* — Chuong T Ho (57) ABSTRACT

A method performed under control of a first device capable of full duplex radio communications may include receiving a first part of a first data from a second device capable of the full duplex radio communications; determining that the second device has transmitted the first data to the first device, based, at least in part, on the received first part of the first data; and transmitting a second data to the second device, while receiving a second part of the first data from the second device.

18 Claims, 7 Drawing Sheets

(51) Int. Cl.
*H04W 28/06* (2009.01)
*H04L 5/00* (2006.01)

(56) References Cited

U.S. PATENT DOCUMENTS

| | | | |
|---|---|---|---|
| 8,509,193 B2 | 8/2013 | Hassan et al. | |
| 9,036,749 B2 | 5/2015 | Choi et al. | |
| 9,226,200 B2 | 12/2015 | Wong et al. | |
| 9,698,860 B2 | 7/2017 | Bharadia et al. | |
| 9,832,003 B2 | 11/2017 | Bharadia et al. | |
| 2008/0253490 A1 | 10/2008 | Hafeez | |
| 2009/0180404 A1 | 7/2009 | Jung et al. | |
| 2010/0022201 A1 | 1/2010 | Vandenameele | |
| 2010/0142559 A1* | 6/2010 | Hu | H04L 5/0053 370/474 |
| 2010/0220708 A1 | 9/2010 | Mantravadi et al. | |
| 2010/0232324 A1 | 9/2010 | Radunovic et al. | |
| 2010/0238932 A1* | 9/2010 | Kliger | H04L 12/4633 370/392 |
| 2011/0002232 A1 | 1/2011 | Niewczas et al. | |
| 2011/0013684 A1 | 1/2011 | Semenov et al. | |
| 2011/0243154 A1* | 10/2011 | Flynn | H04L 1/0072 370/471 |
| 2011/0286340 A1 | 11/2011 | Janecek et al. | |
| 2012/0045986 A1* | 2/2012 | Jitsukawa | H04B 7/15507 455/7 |
| 2012/0201153 A1 | 8/2012 | Bharadia et al. | |
| 2012/0201173 A1 | 8/2012 | Jain et al. | |
| 2013/0042162 A1* | 2/2013 | Muthu | H03M 13/09 714/755 |
| 2013/0194984 A1 | 8/2013 | Cheng et al. | |
| 2013/0286903 A1 | 10/2013 | Khojastepour et al. | |
| 2013/0301487 A1 | 11/2013 | Khandani | |
| 2014/0016515 A1 | 1/2014 | Jana et al. | |
| 2014/0059155 A1 | 2/2014 | Boucher et al. | |
| 2014/0362838 A1* | 12/2014 | Choi | H04L 1/1664 370/338 |
| 2015/0195079 A1* | 7/2015 | Gong | H04L 5/14 370/277 |
| 2016/0087779 A1* | 3/2016 | Lee | H04L 5/14 370/277 |
| 2017/0155496 A1 | 6/2017 | Khandani | |

OTHER PUBLICATIONS

Choi, J.I., et al., "Full-Duplex Wireless Design," accessed at https://web.archive.org/web/20140201025815/http://sing.stanford.edu/fullduplex/, accessed on Sep. 4, 2015, pp. 3.

International Search Report and Written Opinion for International Application No. PCT/US2014/33319 dated Sep. 11, 2014.

International Search Report and Written Opinion for International Application No. PCT/US2014/034208 dated Sep. 10, 2014.

Jain, M., et al., "Practical, Real-time, Full Duplex Wireless," Proceedings of the 17th annual international conference on Mobile computing and networking, pp. 301-312 (Sep. 19-23, 2011).

Lin, Y and Wong, V.W.S., "Frame Aggregation and Optimal Frame Size Adaptation for IEEE 802.11n WLANs," pp. 1-6 (Nov. 27, 2006-Dec. 1, 2006).

Sabharwal, A., "Research Areas," accessed at https://web.archive.org/web/20140314123817/http://www.ece.rice.edu/~ashu/research.html, accessed on Sep. 15, 2015, pp. 2.

Sahai, A et al., "Pushing the limits of Full-duplex: Design and Real-time Implementation," pp. 1-12 (Jul. 2011).

Srinivasan, K., et al., "Beyond Full Duplex Wireless," Asilomar Conference on Signals, Systems and Computers, pp. 1-5 (Nov. 2012).

Zhou, W., et al., "RCTC: Rapid Concurrent Transmission Coordination in Full DuplexWireless Networks," IEEE International Conference on Network Protocols, pp. 1-10 (Oct. 7-10, 2013).

* cited by examiner

FULL DUPLEX RADIO COMMUNICATION

CROSS-REFERENCE TO RELATED APPLICATION

This Application is the U.S. National Stage filing under 35 U.S.C. § 371 of International Application No. PCT/US14/33319, filed on Apr. 8, 2014. The disclosure of the International Application is hereby incorporated herein by reference in its entirety.

BACKGROUND

Duplex communication systems may allow two devices or two nodes to communicate with each other in opposite directions. Duplex communication systems may be widely used in the area of telecommunications and computer networking. Duplex communication systems may include a half-duplex type and a full duplex type. Full-duplex (also known as double-duplex) systems may allow two devices to transmit and receive data between each other, simultaneously.

SUMMARY

In an example, a method performed under control of a first device capable of full duplex radio communications may include receiving a first part of a first data from a second device capable of the full duplex radio communications; determining that the second device has transmitted the first data to the first device, based, at least in part, on the received first part of the first data; and transmitting a second data to the second device, while receiving a second part of the first data from the second device.

In another example, a first device capable of full duplex radio communications may include a receiver configured to receive a first part of a first data from a second device capable of the full duplex radio communications; a data manager configured to determine that the second device has transmitted the first data to the first device, based, at least in part, on the received first part of the first data; and a transmitter configured to transmit a second data to the second device, while the receiver is receiving a second part of the first data from the second device.

In yet another example, a computer-readable storage medium may store thereon computer-executable instructions that, in response to execution, cause a first device capable of full duplex radio communications to perform operations including receiving a header part of a first packet from a second device capable of the full duplex radio communications; decoding the header part of the first packet; determining that the second device has transmitted the first packet to the first device, based, at least in part, on the decoded header part of the first packet; and transmitting a second packet to the second device, while receiving a body part of the first packet from the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to full duplex radio communications. Technologies are generally described for schemes for receiving and transmitting data between two devices via a single channel, simultaneously.

In some examples, a first device may be configured to receive first data from a second device. Respective one of the first device and the second device may be a device capable of full duplex radio communications. For example, the first data may be a data packet. The first data transmitted from the second device may include at least two parts. For example, but not as a limitation, a first part of the first data may be a packet header, which may include information regarding an origin of the first data, a destination of the first data, and a length of the first data. Further, a second part of the first data may be a packet body, which may include actual data to be transmitted. In some embodiments, the first device may be configured to receive the first data in consecutive order from the first part to the second part.

The first device may be configured to decode the first part (e.g., packet header) of the first data. Further, the first device may be configured to determine that the destination of the first data is the first device, based on the decoded first part that may include the information regarding the destination of the first data. Then, the first device may be configured to transmit second data to the second device, while the first device is receiving the remaining second part of the first data from the second device. Thus, although a wireless communication channel is already occupied by the second device, the first device may be configured to transmit data to the second device via the same wireless communication channel simultaneously, when the destination of data which has been transmitted from the second device is the first device.

Figure 1:
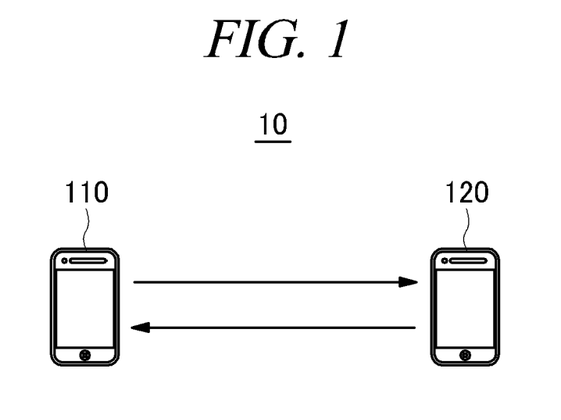
FIG. 1 schematically shows an illustrative example of a full duplex radio communication environment including a first device and a second device, arranged in accordance with at least some embodiments described herein.

FIG. 1 schematically shows an illustrative example of a full duplex radio communication environment 10 including a first device 110 and a second device 120, arranged in accordance with at least some embodiments described herein.

For example, but not as a limitation, respective one of first device 110 and second device 120 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant). In some embodiments, respective one of first device 110 and second device 120 may be a Wi-Fi access point or a base station for a mobile telecommunications network such as a 3rd generation (3G) mobile telecommunications network or a 4th generation (4G) mobile telecommunications network. First device 110 and second device 120 may be capable of full duplex radio communications.

In some embodiments, first device 110 may be configured to receive first data from second device 120. The first data transmitted from second device 120 may include at least two parts. In some embodiments, first device 110 may be configured to receive the first data in consecutive order from a first part to a second part. In some embodiments, the first part of the first data may be a packet header, and the second part of the first data may be a packet body. For example, but not as a limitation, the packet header may include information regarding an origin of the first data and a destination of the first data. Further, the packet header may include information regarding a length of the first data (e.g., a length of the packet header and a length of the packet body). The packet header may further include a checksum for the packet header. Further, the packet body may include actual data to be transmitted and a checksum for the packet body. For example, but not as a limitation, the checksum may refer to an error-detecting code, such as a cyclic redundancy check (CRC) code.

In some embodiments, first device 110 may be configured to decode the packet header of the first data, when first device 110 received the packet header of the first data. Further, first device 110 may be configured to determine that second device 120 has transmitted the first data to first device 110 based on the decoded packet header of the first data, since the packet header includes the information regarding the origin of the first data and the destination of the first data. Thus, first device 110 may be configured to determine that the origin of the first data is second device 120 and the destination of the first data is first device 110, based on the decoded packet header.

Further, first device 110 may be configured to validate the decoded packet header of the first data, based on the checksum for the packet header which is included in the packet header. First device 110 may be configured to decode the packet header correctly before all of the first data is received completely.

Further, first device 110 may be configured to generate second data to be transmitted to second device 120, when first device 110 received the packet header of the first data and decoded the packet header of the first data. In some embodiments, first device 110 may be configured to limit a length of the second data to be shorter than the length of the first data, based on the decoded packet header of the first data, which includes the information regarding the length of the first data. In some embodiments, first device 110 may be configured to generate the second data that has a length equal to or shorter than the remaining length of the first data (e.g., the length of the packet body of the first data).

Further, first device 110 may be configured to transmit the second data to second device 120, while first device 110 is receiving the remaining second part of the first data transmitted from second device 120. In some embodiments, first device 110 may be configured to transmit the second data to second device 120, while first device 110 is receiving the packet body that may include actual data of the first data. Thus, although a wireless communication channel is already occupied by second device 120, first device 110 may be configured to transmit the second data to second device 120 via the same wireless communication channel simultaneously, when the destination of the first data which has been transmitted from second device 120 is first device 110 and the destination of the second data which is transmitted from first device 110 is second device 120. Thus, full duplex communications using a single channel between first device 110 and second device 120 may be implemented.

Figure 2:
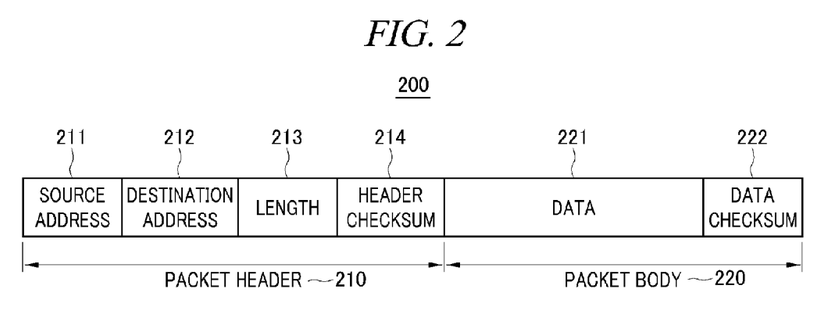
FIG. 2 shows an example of a data structure of first data, arranged in accordance with at least some embodiments described herein.

FIG. 2 shows an example of a data structure of first data, arranged in accordance with at least some embodiments described herein. In some embodiments, as depicted in FIG. 2, first data 200 which is transmitted from second device 120 to first device 110 may include a packet header 210 and a packet body 220. Further, packet header 210 may include a source address 211, a destination address 212, a length 213 that includes a length of packet header 210 and a length of packet body 220, and a header checksum 214. Further, packet body 220 may include data 221 and a data checksum 222. In FIG. 2, packet header 210 includes source address 211, destination address 212, length 213 and header checksum 214, but other additional information may be included in packet header 210. Further, in FIG. 2, packet body 220 includes data 221 and data checksum 222, but other additional information may be included in packet body 220.

First device 110 may be configured to receive packet header 210 from second device 120. Further, first device 110 may be configured to decode packet header 210, and to validate decoded packet header 210, based at least in part on header checksum 214. Further, first device 110 may be configured to determine that second device 120 has transmitted first data 200 to first device 110, based on the received packet header 210. First device 110 may be configured to determine that the source of first data 200 is second device 120 and the destination of first data 200 is first device 110 by checking source address 211 and destination address 212 included in decoded packet header 210. Further, first device 110 may be configured to generate second data that has a length shorter than a length of first data 200, based on length 213 included in packet header 210. Then, first device 110 may be configured to transmit the second data to second device 120 simultaneously, while first device 110 is receiving packet body 220 of first data 200.

Figure 3:
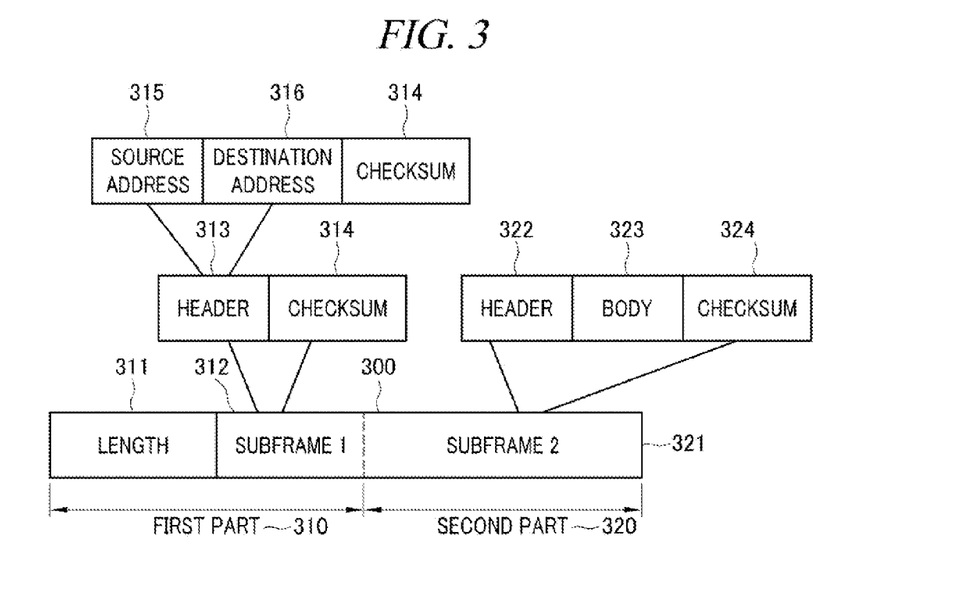
FIG. 3 shows another example of a data structure of first data, arranged in accordance with at least some embodiments described herein.

FIG. 3 shows another example of a data structure of first data, arranged in accordance with at least some embodiments described herein. In some embodiments, first device 110 and second device 120 may be configured to transmit and receive data while implementing full duplex radio communications by using a frame aggregation method. The frame aggregation may refer to a method to increase transmission efficiency or throughput by sending two or more data frames in a single transmission. By way of example, but not as a limitation, the frame aggregation method may refer to a mac service data unit (MSDU) aggregation method and a mac protocol data unit (MPDU) aggregation method.

As depicted in FIG. 3, first data 300 which is transmitted from second device 120 to first device 110 may include a first part 310 and a second part 320. In some embodiments, first data 300 may be a frame aggregated data. First part 310 may include a length 311 of first data 300 and a first subframe 312. Further, second part 320 may include a second subframe 321. In some embodiments, first subframe 312 may be a first orthogonal frequency division multiplexing (OFDM) frame and second subframe 321 may be a second OFDM frame.

Further, first subframe 312 may include a header 313 and a checksum 314 for first subframe 312 (e.g., first OFDM frame). Further, second device 120 may be configured to set first subframe 312 to have null data. Further, header 313 may include a source address 315 that includes an origin of first data 300 and a destination address 316. In FIG. 3, first part 310 of first data 300 includes length 311 of first data 300 and first subframe 312, but other additional information may be included in first part 310 of first data 300. Further, in FIG. 3, first subframe 312 includes header 313 and checksum 314, but other additional information may be included in first subframe 312. Further, in FIG. 3, header 313 includes source address 315 and destination address 316, but other additional information may be included in header 313.

Further, second subframe 321 may include a header 322, a body 323 that includes actual data to be transmitted and a checksum 324 for second subframe 321 (e.g., second OFDM frame). In FIG. 3, second subframe 321 includes header 322, body 323 and checksum 324, but other additional information may be included in second subframe 321.

First device 110 may be configured to receive first part 310 of first device 300 from second device 120. Further, first device 110 may be configured to decode first part 310, and to validate decoded first part 310, based at least in part on checksum 314. Further, first device 110 may be configured to determine that second device 120 has transmitted first data 300 to first device 110, based on the received first part 310. First device 110 may be configured to determine that the source of first data 300 is second device 120 and the destination of first data 300 is first device 110 by checking source address 315 and destination address 316 included in first subframe 312. Further, first device 110 may be configured to generate second data that has a length shorter than a length of first data 300, based on length 311 included in first part 310. Then, first device 110 may be configured to transmit the second data to second device 120 simultaneously, while first device 110 is receiving second part 320 of first data 300. Thus, first device 110 may be configured to use first subframe 310 as a packet header and to use second subframe 320 as a packet body to implement full duplex radio communications.

Figure 4:
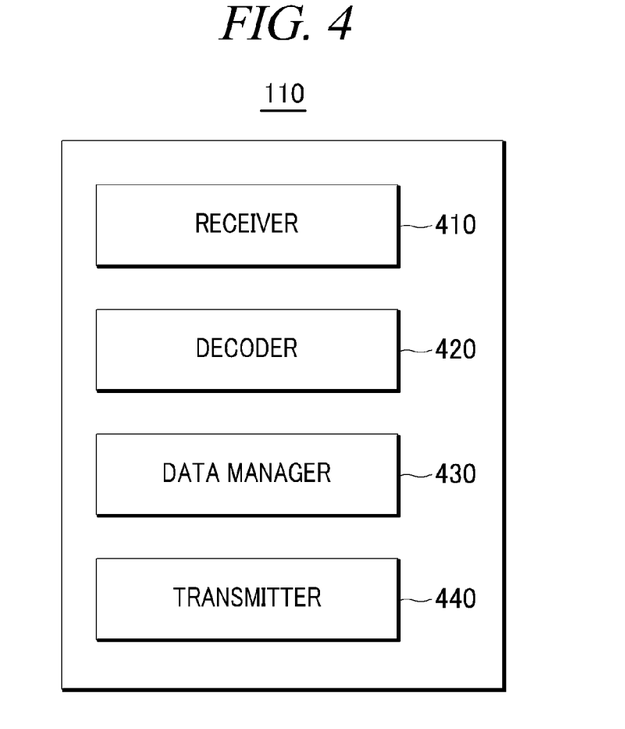
FIG. 4 shows a schematic block diagram illustrating an example architecture for a device, arranged in accordance with at least some embodiments described herein.

FIG. 4 shows a schematic block diagram illustrating an example architecture for a device, arranged in accordance with at least some embodiments described herein. As depicted in FIG. 4, for example, first device 110 may include a receiver 410, a decoder 420, a data manager 430 and a transmitter 440. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiver 410, decoder 420, data manager 430 and transmitter 440 may be included in an instance of an application hosted by first device 110.

Receiver 410 may be configured to receive a first part of first data from second device 120 which is capable of full duplex radio communications. In some embodiments, receiver 410 may be configured to receive the first part of the first data from second device 120. In some embodiments, the first part of the first data may be a packet header. For example, but not as a limitation, the packet header may include information regarding an origin of the first data and a destination of the first data. Further, the packet header may include information regarding a length of the first data (e.g., a length of the packet header and a length of a packet body). The packet header may further include a checksum for the packet header. For example, but not as a limitation, the checksum may refer to an error-detecting code, such as a cyclic redundancy check (CRC) code.

Receiver 410 may be configured to receive a second part of the first data. Receiver 410 may be configured to receive the first data in consecutive order from the first part to the second part. In some embodiments, the second part of the first data may be a packet body. For example, but not as a limitation, the packet body may include actual data to be transmitted to first device 110 and a checksum for the packet body. In some embodiments, receiver 410 may be configured to receive the second part of the first data, while transmitter 440 is transmitting second data to second device 120.

In some other embodiments, the first part of the first data may include a first orthogonal frequency division multiplexing (OFDM) frame, and the second part of the first data may include a second OFDM frame. For example, but not as a limitation, the first OFDM frame may include a first header that may include information regarding an origin of the first data, a destination of the first data and a checksum for the first OFDM frame. Further, the first OFDM frame may have null data. Further, the first part of the first data may further include length information of the first data. Further, the second OFDM frame may include a second header, a body that may include actual data to be transmitted and a checksum for the second OFDM frame. First device 110 may be configured to use the first OFDM frame as a packet header and to use the second OFDM frame as a packet body to implement full duplex radio communications.

In some embodiments, decoder 420 may be configured to decode the packet header of the first data. Further, decoder 420 may be configured to validate the decoded packet header of the first data, based on the checksum for the packet header which is included in the decoded packet header. Decoder 420 may be configured to decode the packet header correctly before all of the first data is received completely, since the packet header includes the checksum for the packet header.

In some other embodiments, decoder 420 may be configured to decode the first OFDM frame, and validate the decoded first OFDM frame of the first data, based on the checksum for the first OFDM frame.

Data manager 430 may be configured to determine that second device 120 has transmitted the first data to first device 110, based on the first part of the first data, which is received by receiver 410. In some embodiments, data manager 430 may be configured to determine that second device 120 has transmitted the first data to first device 110 based on the decoded packet header of the first data, since the packet header includes the information regarding the origin of the first data and the destination of the first data. Thus, data manager 430 may be configured to determine that the origin of the first data is second device 120 and the destination of the first data is first device 110, based on the decoded packet header.

In some other embodiments, data manager 430 may be configured to determine that second device 120 has transmitted the first data to first device 110 based on the decoded first OFDM frame, since the decoded first OFDM frame includes the origin of the first data and the destination of the first data.

Further, data manager 430 may be configured to generate the second data to be transmitted to second device 120. In some embodiments, data manager 430 may be configured to limit a length of the second data to be shorter than the length of the first data, based on the decoded packet header of the first data, which includes the information regarding the length of the first data. In some embodiments, data manager 430 may be configured to generate the second data that has a length equal to or shorter than the remaining length of the first data (e.g., the length of the packet body of the first data).

Transmitter 440 may be configured to transmit the second data to second device 120, while receiver 410 is receiving the second part of the first data transmitted from second device 120. In some embodiments, transmitter 440 may be configured to transmit the second data to second device 120, while receiver 410 is receiving the packet body that may include actual data of the first data. In some other embodiments, transmitter 440 may be configured to transmit the second data to second device 120, while receiver 410 is receiving the second OFDM frame that may include actual data of the first data. Thus, although a wireless communication channel is already occupied by second device 120, first device 110 may be configured to transmit the second data to second device 120 via the same wireless communication channel simultaneously, when the destination of the first data which has been transmitted from second device 120 is first device 110 and the destination of the second data which is transmitted from first device 110 is second device 120. Thus, full duplex communications using a single channel between first device 110 and second device 120 may be implemented.

Figure 5:
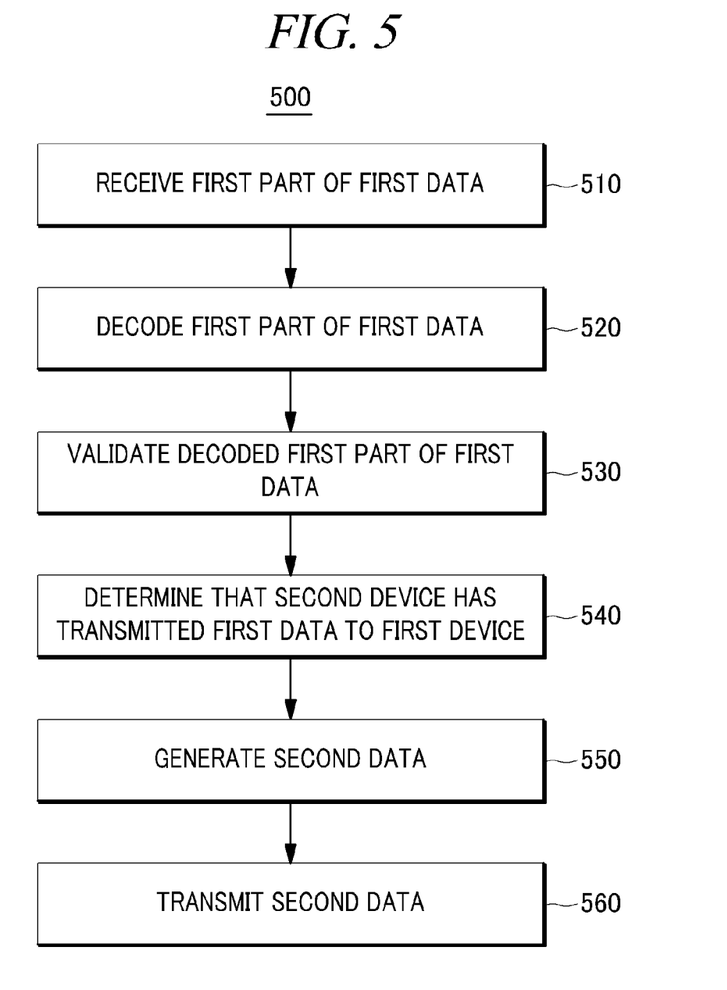
FIG. 5 shows an example flow diagram of a process for full duplex radio communications, arranged in accordance with at least some embodiments described herein.

FIG. 5 shows an example flow diagram of a process 500 for full duplex radio communications, arranged in accordance with at least some embodiments described herein. The operations of process 500 may be implemented in full duplex radio communication environment 10 including first device 110 and second device 120, as illustrated in FIG. 1. Process 500 may include one or more operations, actions, or functions as illustrated by one or more blocks 510, 520, 530, 540, 550 and/or 560. Although illustrated as discrete blocks, various blocks may be divided into additional blocks, combined into fewer blocks, or eliminated, depending on the desired implementation. Processing may begin at block 510.

At block 510 (Receive First Part of First Data), first device 110 may receive a first part of first data from second device 120 which is capable of full duplex radio communications. In some embodiments, the first part of the first data may be a packet header. For example, but not as a limitation, the packet header may include information regarding an origin of the first data and a destination of the first data. Further, the packet header may include information regarding a length of the first data (e.g., a length of the packet header and a length of a packet body). The packet header may further include a checksum for the packet header. For example, but not as a limitation, the checksum may refer to an error-detecting code, such as a cyclic redundancy check (CRC) code. Processing may proceed from block 510 to block 520.

At block 520 (Decode First Part of First Data), first device 110 may decode the first part of the first data, which is received at block 510. In some embodiments, first device 110 may decode the packet header of the first data. Thus, at block 520, first device 110 may obtain the information regarding the origin of the first data, the destination of the first data, the length of the first data, and the checksum for the packet header. Processing may proceed from block 520 to block 530.

At block 530 (Validate Decoded First Part of First Data), first device 110 may validate the decoded first part of the first data. In some embodiments, first device 110 may validate the decoded packet header of the first data, based on the checksum for the packet header which is included in the decoded packet header. Processing may proceed from block 530 to block 540.

At block 540 (Determine that Second Device Has Transmitted First Data to First Device), first device 110 may determine that second device 120 has transmitted the first data to first device 110, based on the received first part of the first data. In some embodiments, first device 110 may determine that second device 120 has transmitted the first data to first device 110 based on the packet header decoded at block 520, since the packet header includes the information regarding the origin of the first data and the destination of the first data. Thus, first device 110 may determine that the origin of the first data is second device 120 and the destination of the first data is first device 110, based on the decoded packet header. Processing may proceed from block 540 to block 550.

At block 550 (Generate Second Data), first device 110 may generate second data to be transmitted to second device 120. In some embodiments, first device 110 may limit a length of the second data to be shorter than the length of the first data, based on the decoded packet header of the first data, which includes the information regarding the length of the first data. In some embodiments, first device 110 may generate the second data that has a length equal to or shorter than the remaining length of the first data (e.g., the length of the packet body of the first data). Processing may proceed from block 550 to block 560.

At block 560 (Transmit Second Data), first device 110 may transmit the second data generated at block 550 to second device 120, while first device 110 is receiving the second part of the first data transmitted from second device 120, simultaneously. In some embodiments, first device 110 may transmit the second data to second device 120, while first device 110 is receiving the packet body that may include actual data to be transmitted. Thus, although a wireless communication channel is already occupied by second device 120, first device 110 may be configured to transmit the second data to second device 120 via the same wireless communication channel simultaneously, when the destination of the first data which has been transmitted from second device 120 is first device 110 and the destination of the second data which is transmitted from first device 110 is second device 120. Thus, full duplex communications using a single channel between first device 110 and second device 120 may be implemented.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
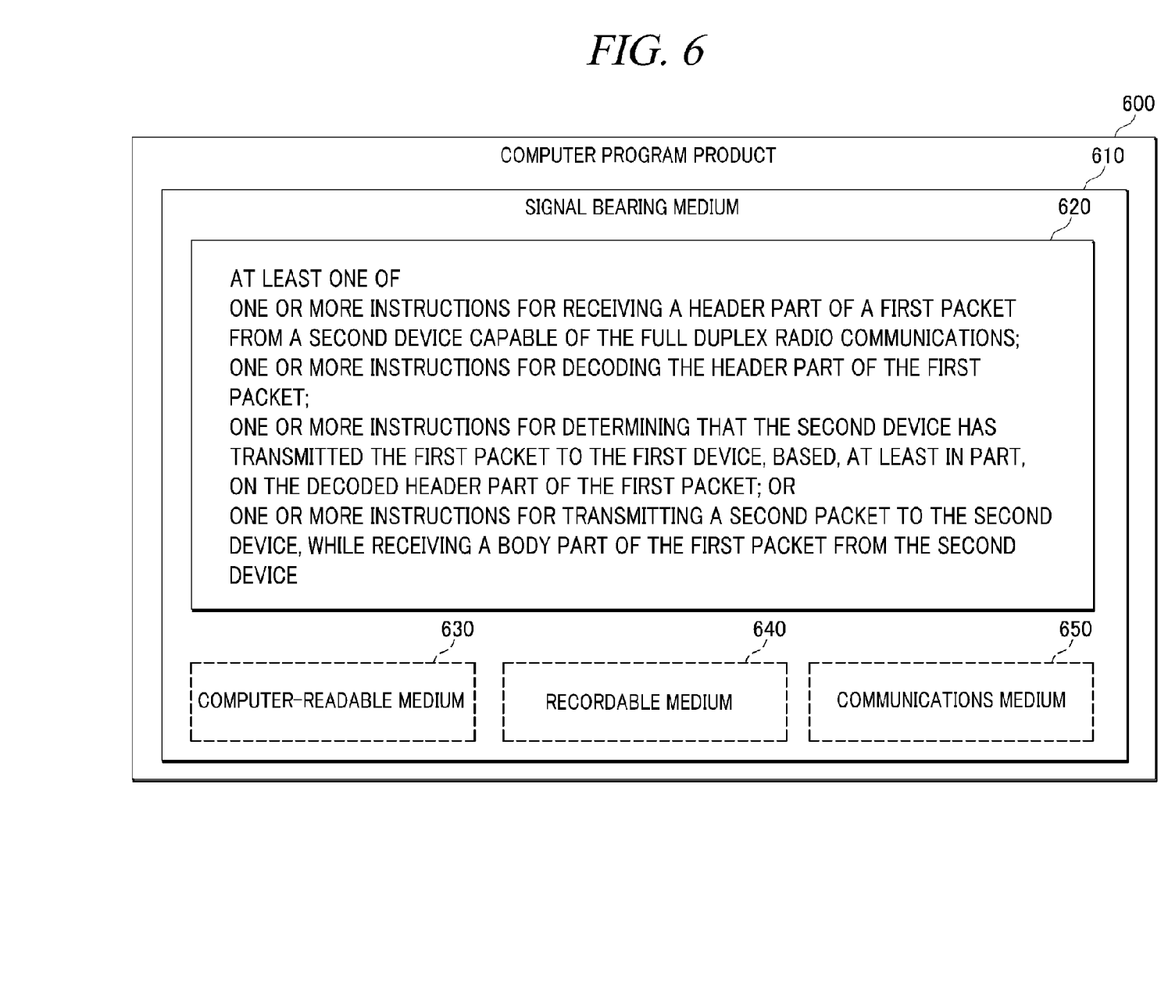
FIG. 6 illustrates computer program products that may be utilized to implement full duplex radio communications, arranged in accordance with at least some embodiments described herein.

FIG. 6 illustrates computer program products that may be utilized to implement full duplex radio communications, arranged in accordance with at least some embodiments described herein. Program product 600 may include a signal bearing medium 610. Signal bearing medium 610 may include one or more instructions 620 that, when executed by, for example, a processor, may provide the functionality described above with respect to FIGS. 1-5. By way of example, but not limitation, instructions 620 may include: one or more instructions for receiving a header part of a first packet from a second device capable of the full duplex radio communications; one or more instructions for decoding the header part of the first packet; one or more instructions for determining that the second device has transmitted the first packet to the first device, based, at least in part, on the decoded header part of the first packet; or one or more instructions for transmitting a second packet to the second device, while receiving a body part of the first packet from the second device. Thus, for example, referring to FIG. 5, first device 110 may undertake one or more of the blocks shown in FIG. 5 in response to instructions 620.

In some implementations, signal bearing medium 610 may encompass a computer-readable medium 630, such as, but not limited to, a hard disk drive, a CD, a DVD, a digital tape, memory, etc In some implementations, signal bearing medium 610 may encompass a recordable medium 640, such as, but not limited to, memory, read/write (R/W) CDs, R/W DVDs, etc In some implementations, signal bearing medium 610 may encompass a communications medium 650, such as, but not limited to, a digital and/or an analog communication medium (e.g., a fiber optic cable, a waveguide, a wired communications link, a wireless communication link, etc). Thus, for example, program product 600 may be conveyed to one or more modules of first device 105 by an RF signal bearing medium 610, where the signal bearing medium 610 is conveyed by a wireless communications medium 650 (e.g., a wireless communications medium conforming with the IEEE 802.11 standard).

Figure 7:
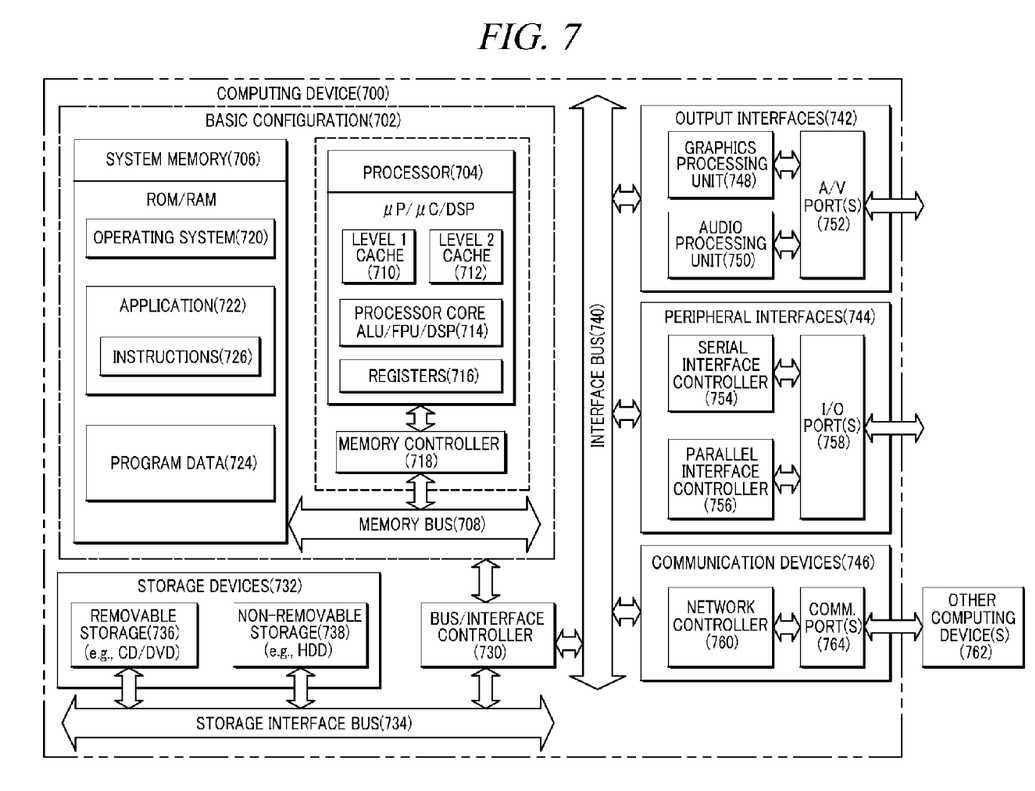
FIG. 7 is a block diagram illustrating an example computing device that may be utilized to implement full duplex radio communications, arranged in accordance with at least some embodiments described herein.

FIG. 7 is a block diagram illustrating an example computing device that may be utilized to implement full duplex radio communications, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc) or any combination thereof. System memory 706 may include an operating system 720, an application 722, and program data 724. Application 722 may include instructions 726 that may be arranged to perform the functions as described herein including the actions described with respect to first device architecture as shown in FIG. 4 or including the actions described with respect to the flow charts shown in FIG. 5. In some examples, application 722 may be arranged to operate with program data 724 on an operating system 720 such that the full duplex radio communicating schemes as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output interfaces 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc) or other peripheral devices (e.g., printer, scanner, etc) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc As a non-limiting example, each range discussed herein can be readily broken down into a lower third, middle third and upper third, etc As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a first device capable of full duplex radio communication, the method comprising:
  receiving a first part of first data from a second device capable of the full duplex radio communication, wherein the first part of the first data includes a checksum for the first part of the first data;
  decoding the first part of the first data;
  validating the decoded first part of the first data, based, at least in part, on the checksum for the first part of the first data, wherein the first part of the first data includes a packet header;
  determining that the second device has transmitted the first data to the first device, based, at least in part, on the validated first part of the first data;
  generating second data, with a length shorter than a length of the first data based, at least in part, on the packet header of the first data; and
  in response to the determination that the second device has transmitted the first data to the first device, transmitting the second data to the second device, while receiving a second part of the first data from the second device.

2. The method of claim 1, wherein the second part of the first data includes a packet body.

3. The method of claim 2,
wherein:
  the decoding the first part of the first data includes decoding the packet header of the first data, and
  the determining is based on the decoded packet header of the first data.

4. The method of claim 2, wherein the packet header of the first data includes information regarding an origin of the first data and a destination of the first data.

5. The method of claim 2, wherein the packet header of the first data includes information regarding the length of the first data.

6. The method of claim 5, wherein the length of the second data is equal to a length of the packet body of the first data.

7. The method of claim 1, wherein the first part of the first data includes a first orthogonal frequency division multiplexing (OFDM) frame, and wherein the second part of the first data includes a second OFDM frame.

8. The method of claim 7, wherein the first OFDM frame has null data, and wherein the first OFDM frame includes information regarding an origin of the first data and a destination of the first data.

9. A first device capable of full duplex radio communication, the first device comprising:
  a receiver configured to receive a first part of a first data from a second device capable of the full duplex radio communication, wherein the first part of the first data includes a checksum for the first part of the first data, and wherein the first part of the first data includes a packet header;
  a decoder coupled to the receiver and configured to:
    decode the first part of the first data, and
    validate the decoded first part of the first data, based, at least in part, on the checksum for the first part of the first data;
  a data manager, coupled to the decoder, configured to:
    generate second data, with a length shorter than a length of the first data, based, at least in part, on the packet header of the first data; and
    determine that the second device has transmitted the first data to the first device, based, at least in part, on the validated first part of the first data; and
  a transmitter coupled to the data manager and configured to, in response to the determination by the data manager that the second device has transmitted the first data to the first device, transmit the second data to the second device, while the receiver receives a second part of the first data from the second device.

10. The first device of claim 9, wherein the second part of the first data includes a packet body.

11. The first device of claim 10,
wherein:
  the decoder is configured to decode the packet header of the first data, and
  the data manager is configured to determine that the second device has transmitted the first data to the first device, based on the decoded packet header of the first data.

12. The first device of claim 10, wherein the packet header of the first data includes information regarding an origin of the first data and a destination of the first data.

13. The first device of claim 10, wherein the packet header of the first data includes information regarding the length of the first data.

14. The first device of claim 13, wherein the length of the second data is equal to a length of the packet body of the first data.

15. The first device of claim 9, wherein the first part of the first data includes a first orthogonal frequency division multiplexing (OFDM) frame, and wherein the second part of the first data includes a second OFDM frame.

16. The first device of claim 15, wherein the first OFDM frame includes null data, and wherein the first OFDM frame includes information regarding an origin of the first data and a destination of the first data.

17. A non-transitory computer-readable storage medium having stored thereon computer-executable instructions that, in response to execution, cause a first device capable of full duplex radio communication to perform or control performance of operations, comprising:
  identify a header part, of a first packet, received from a second device capable of the full duplex radio communication, wherein the header part of the first packet includes information regarding a length of the first packet;
  decode the header part of the first packet;
  determine that the second device has transmitted the first packet to the first device, based, at least in part, on the decoded header part of the first packet;
  in response to the determination that the second device has transmitted the first packet to the first device, generate a second packet that has a length shorter than the length of the first packet, based, at least in part, on the decoded header part of the first packet; and
  transmit the second packet to the second device, while a body part of the first packet is received from the second device, wherein a length of the body part of the first packet is equal to the length of the second packet.

18. The non-transitory computer-readable storage medium of claim 17, wherein the header part of the first packet includes information regarding an origin of the first packet and a destination of the first packet.

* * * * *